(12) United States Patent
Hikosaka et al.

(10) Patent No.: US 11,327,252 B2
(45) Date of Patent: May 10, 2022

(54) OPTICAL CONNECTOR

(71) Applicant: YAZAKI CORPORATION, Tokyo (JP)

(72) Inventors: Tomohiro Hikosaka, Makinohara (JP); Hiroshi Miyazaki, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 147 days.

(21) Appl. No.: 16/879,716

(22) Filed: May 20, 2020

(65) Prior Publication Data

US 2020/0379191 A1 Dec. 3, 2020

(30) Foreign Application Priority Data

May 27, 2019 (JP) .............................. JP2019-098679

(51) Int. Cl.
*G02B 6/38* (2006.01)
*H01R 13/502* (2006.01)
*H01R 13/627* (2006.01)
*H01R 13/629* (2006.01)

(52) U.S. Cl.
CPC ......... *G02B 6/3893* (2013.01); *G02B 6/3825* (2013.01); *G02B 6/3869* (2013.01); *H01R 13/502* (2013.01); *H01R 13/629* (2013.01); *H01R 13/6272* (2013.01)

(58) Field of Classification Search
CPC . G02B 6/3893; H01R 13/502; H01R 13/6272

USPC .......................................................... 385/78
See application file for complete search history.

(56) References Cited

U.S. PATENT DOCUMENTS

2008/0260333 A1* 10/2008 Roth .................... G02B 6/3869
385/72
2011/0058773 A1 3/2011 Peterhans et al.

FOREIGN PATENT DOCUMENTS

| CN | 102016670 A | | 4/2011 | |
|---|---|---|---|---|
| JP | H10300980 A | * | 11/1988 | |
| JP | 2000314825 A | * | 11/2000 | |
| JP | 2004234008 A | * | 8/2004 | ........... G02B 6/3843 |
| JP | 2014-44335 A | | 3/2014 | |

* cited by examiner

*Primary Examiner* — Kaveh C Kianni
(74) *Attorney, Agent, or Firm* — Kenealy Vaidya LLP

(57) ABSTRACT

An optical connector includes an optical fiber, a ferrule provided at an end portion of the optical fiber, a plug housing in which the ferrule is accommodated, a lock arm provided on the plug housing and holding the plug housing and the mating housing in a fitted state, a holder assembled to the plug housing to hold the ferrule in the plug housing, and a holder protrusion provided on the holder and pressed by the lock arm which is flexibly deformed in an unlocking direction by a predetermined amount or more so that the holder is displaced in a direction of releasing the ferrule from being held by the holder.

3 Claims, 8 Drawing Sheets

OPTICAL CONNECTOR

CROSS-REFERENCE TO RELATED APPLICATIONS

This application is based on and claims priority under 35 USC 119 from Japanese Patent Application No. 2019-098679 filed on May 27, 2019, the contents of which are incorporated herein by reference.

TECHNICAL FIELD

The present invention relates to an optical connector.

BACKGROUND ART

An optical connector in the related art includes an optical fiber, a ferrule that is provided at an end portion of the optical fiber and into which a core wire of the optical fiber is inserted, a connector housing serving as a housing in which the ferrule is accommodated, and a holder that is assembled to the connector housing and holds the ferrule in the connector housing (see Patent Literature 1).

The holder is locked to the connector housing via a lock portion. The lock portion includes a temporary lock portion that holds the holder to the connector housing in a temporary lock position to allow the ferrule to be accommodated in the connector housing, and a main lock portion that holds the holder in a main lock position by inserting the holder into the connector housing in a state in which the ferrule is accommodated in the connector housing.

CITATION LIST

Patent Literature

Patent Literature 1: JP-A-2014-44335

SUMMARY OF INVENTION

In the optical connector described above, when the end portion of the optical fiber is scratched or when the optical fiber is detached from the ferrule, it is necessary to release the holder from a main lock state into a temporary lock state relative to the connector housing and detach the ferrule from the connector housing.

When the holder is released from the main lock state into the temporary lock state relative to the connector housing, a holder releasing jig is necessary. Further, in order to bring the holder into the temporary lock state, it is necessary to release the holder from the main lock state into the temporary lock state after releasing the optical connector from a mating optical connector fitted thereto, which takes time for releasing the holder.

The present invention is made in view of the above circumstances and an object thereof is to provide an optical connector capable of easily releasing a holder from a housing without a holder releasing jig and of improved maintainability.

The object of the present invention is achieved by the following configuration.

(1) An optical connector includes: an optical fiber; a ferrule provided at an end portion of the optical fiber; a housing in which the ferrule is accommodated; a lock arm that is provided on the housing and is flexibly deformed when being fitted with a mating housing and restores after the fitting to lock the mating housing so that the housing and the mating housing are held in a fitted state; a holder assembled to the housing to hold the ferrule in the housing; and a holder protrusion that is provided on the holder and is pressed by the lock arm which is flexibly deformed in an unlocking direction by a predetermined amount or more so that the holder is displaced in a direction of releasing the ferrule from being held by the holder.

According to the optical connector having the configuration in (1), when the lock arm is flexibly deformed by a predetermined amount or more in the unlocking direction, the lock arm is abutted against the holder protrusion provided on the holder holding the ferrule in the housing. By flexibly deforming the lock arm in the unlocking direction, the holder can release the ferrule from being held by being displaced in a direction of releasing the ferrule from being held.

That is, by pressing the operation portion of the lock arm and causing the lock arm to flexibly deform, the holder can be displaced in a direction of releasing the ferrule from being held so that the ferrule can be released from being held in the housing. Therefore, no holder releasing jig is necessary. When the housing is released from being fitted with the mating housing, the lock arm is flexibly deformed and released from being locked to the mating housing. In conjunction with this, the holder can be released from holding the ferrule. It is also possible to easily release the holder from the housing and improve the maintainability.

(2) In the optical connector according to (1), the holder is locked to a locked portion of the housing by a lock portion, the lock portion including a temporary lock portion that holds the holder to the housing to allow the ferrule to be inserted into the housing, and a main lock portion that holds the holder by inserting the holder into the housing in a state in which the ferrule is accommodated in the housing.

According to the optical connector having the configuration in (2), the holder is locked to the locked portion of the housing via the lock portion including the temporary lock portion and the main lock portion.

Therefore, when the holder in the main lock position, in which the main lock portion is locked to the locked portion of the housing to hold the ferrule in the housing, is displaced in the direction of releasing the ferrule from being held via the lock arm flexibly deformed in the unlocking direction, the temporary lock portion moves to the temporary lock position of being locked to the locked portion of the housing. Accordingly, the holder displaced in the direction of releasing the ferrule from being held would not be inadvertently detached from the housing.

(3) In the optical connector according to (2), a lock surface of the main lock portion is an inclined surface that causes the lock portion to flexibly deform in an unlocking direction by coming into sliding contact with a lock surface of the locked portion.

According to the optical connector having the configuration in (3), the lock surface of the main lock portion is an inclined surface that causes the lock portion to flexibly deform in the unlocking direction by coming into sliding contact with the lock surface of the locked portion.

Therefore, when the holder in the main lock position is displaced in the direction of releasing the ferrule from being held, the main lock portion is smoothly released from the locked portion. Since the holder is displaced in the direction of releasing the ferrule from being held, the operating force causing the lock arm to flexibly deform by pressing the operation portion of the lock arm can be reduced.

(4) In the optical connector according to (2), the holder protrusion is provided in a middle position between a pair of the lock portions extending on two side portions of the holder in a direction of being attached to the housing.

According to the optical connector having the configuration in (4), when the holder in the main lock position moves to the temporary lock position via the lock arm flexibly deformed in the unlocking direction, the lock arm is abutted against the holder protrusion provided in the middle position between the pair of lock portions extending on two side portions of the holder. By flexibly deforming the lock arm in the unlocking direction, the holder is pressed via the holder protrusion and displaced in the direction of releasing the ferrule from being held.

Therefore, a pressing force acting on the holder protrusion evenly acts on the pair of lock portions extending on two side portions of the holder so that the lock portions can be evenly flexibly deformed in the unlocking direction. Therefore, the holder can smoothly move to the temporary lock position without tilting.

According to the optical connector of the present invention, it is possible to easily release a holder from a housing without a holder releasing jig and improve maintainability.

The present invention is briefly described as above. Details of the present invention will be further clarified by reading a mode for carrying out the present invention described below (hereinafter, referred to as "embodiment") with reference to the accompanying drawings.

DESCRIPTION OF EMBODIMENTS

Hereafter, an embodiment of the present invention will be described below with reference to the drawings.

Figure 1:
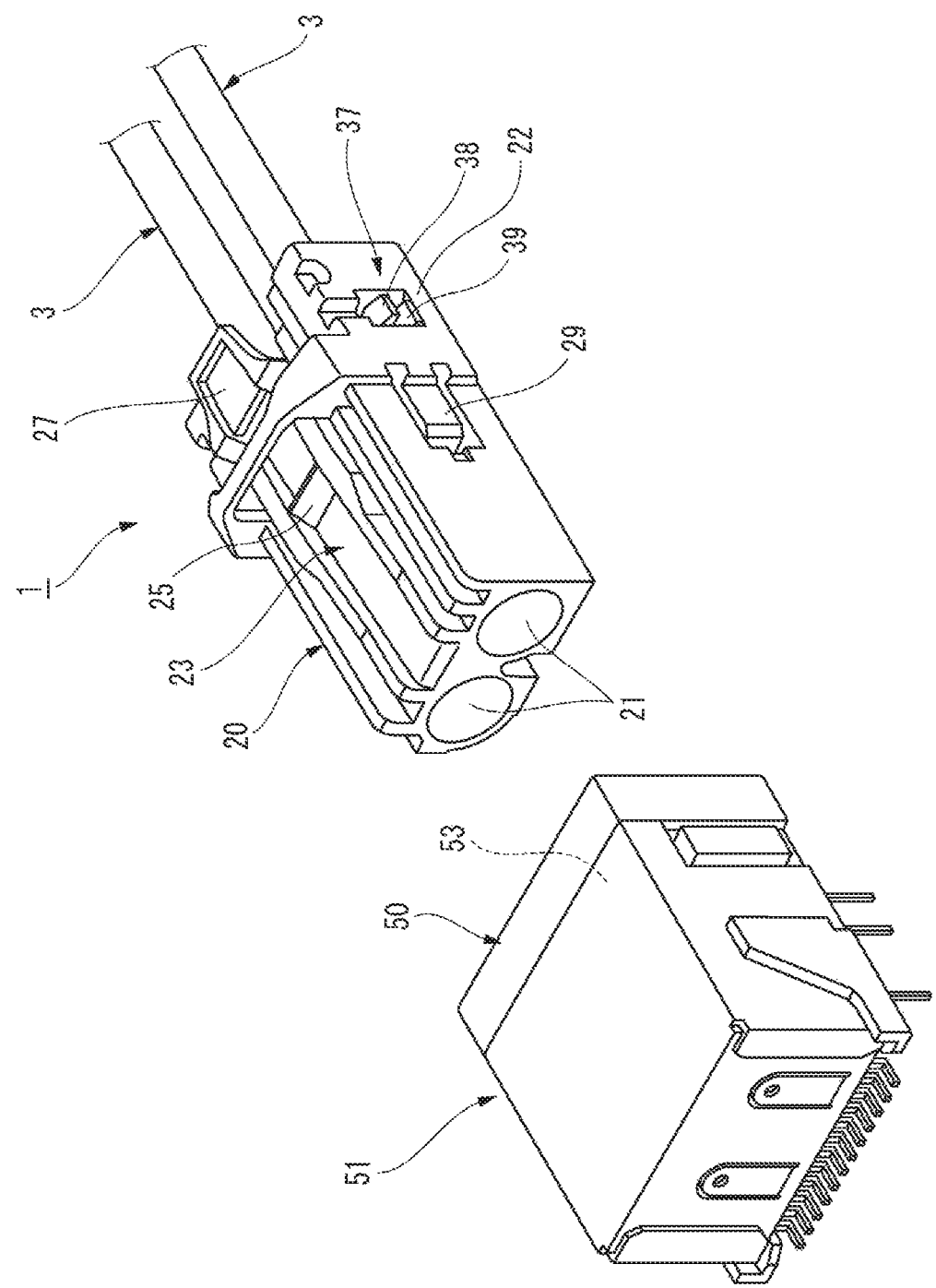
FIG. 1 is a perspective view of an optical connector and a mating optical connector according to an embodiment of the present invention.
Figure 2:
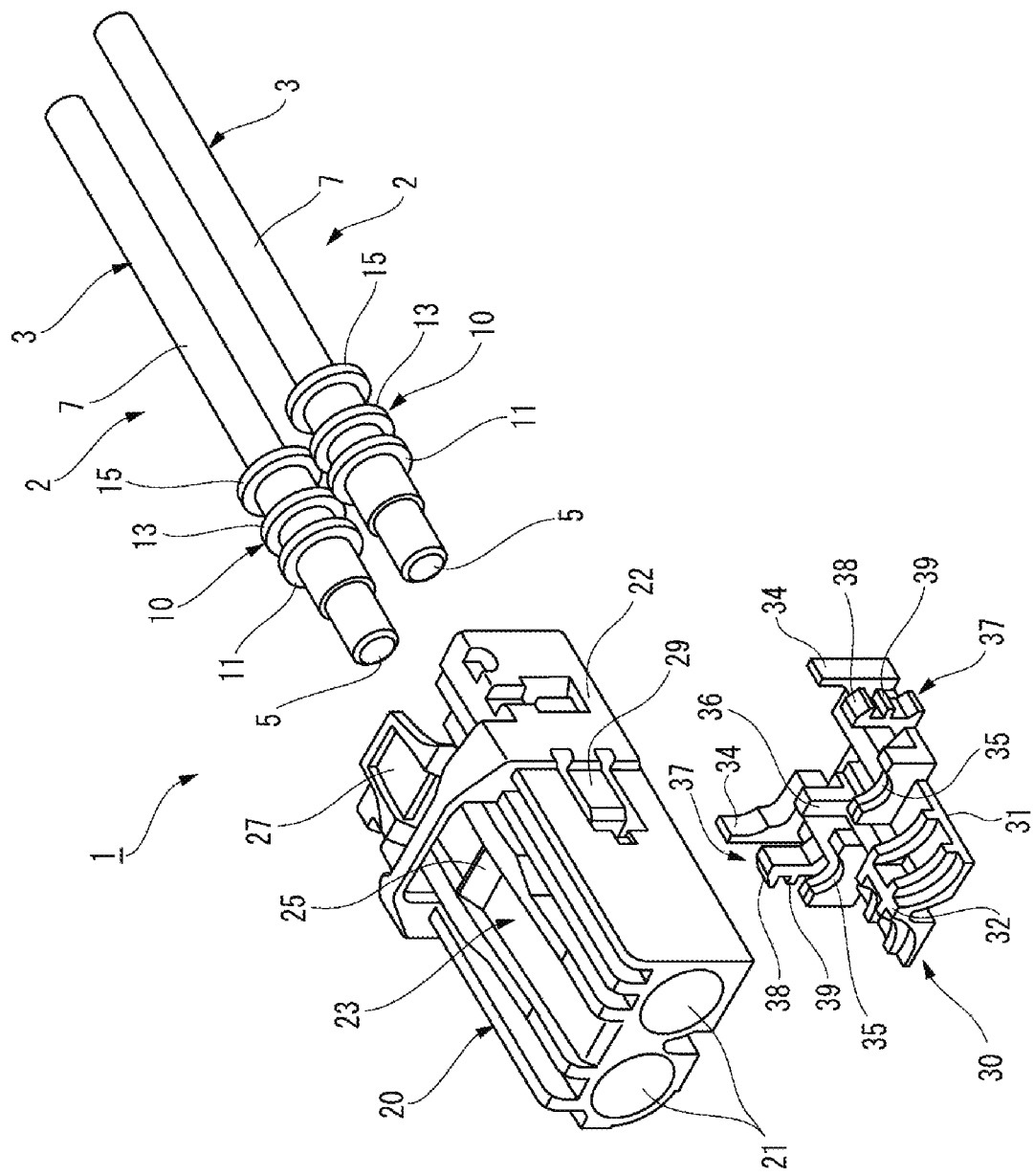
FIG. 2 is an exploded perspective view of the optical connector in FIG. 1.
Figure 3:
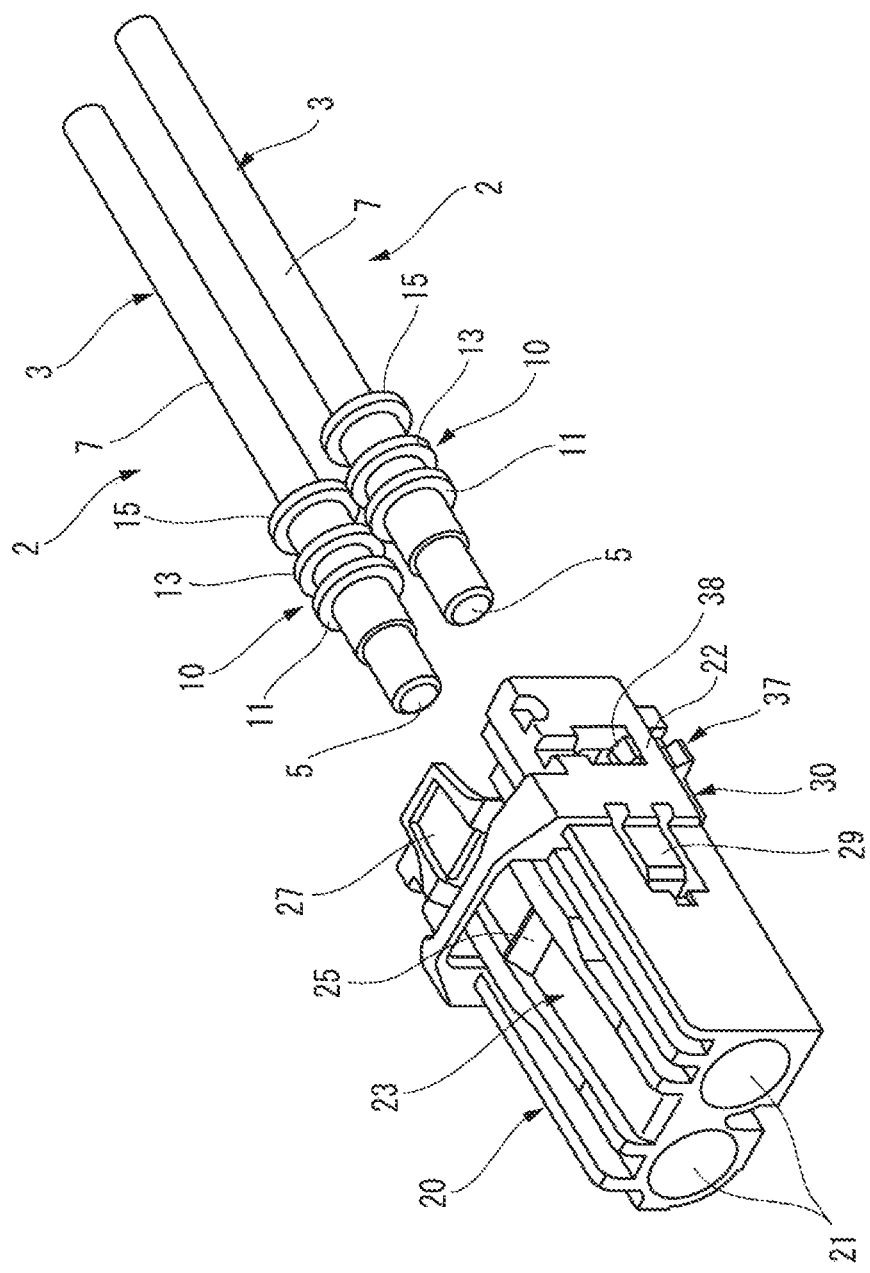
FIG. 3 is a perspective view of a state that a ferrule provided at an end portion of an optical fiber is removed from the optical connector.
Figure 4A:
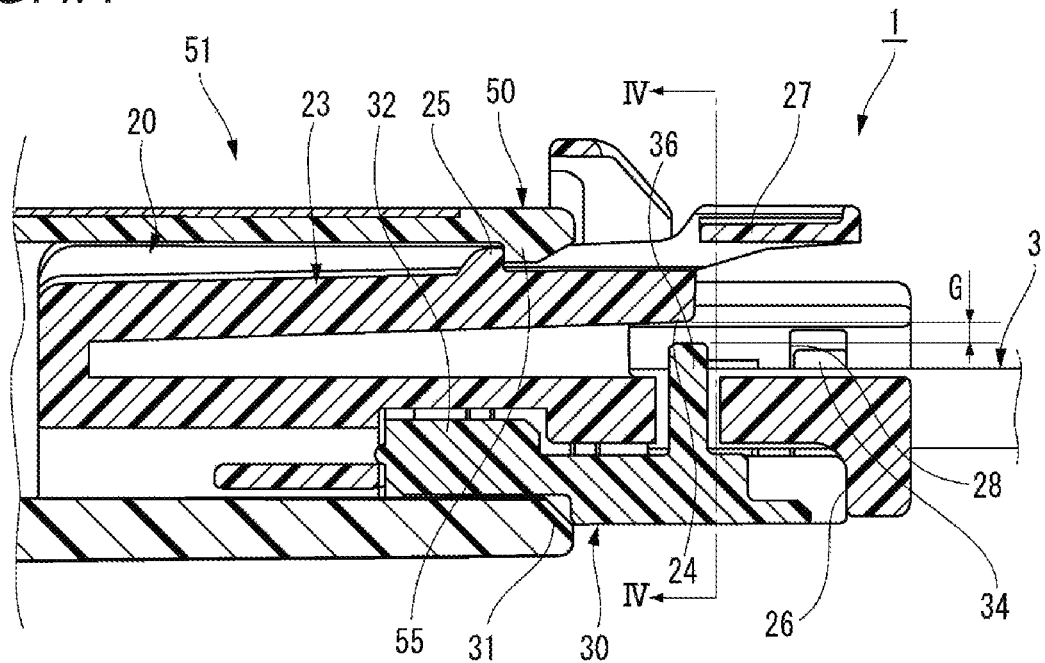
FIG. 4A is a longitudinal sectional view of the optical connector in FIG. 1.
Figure 4B:
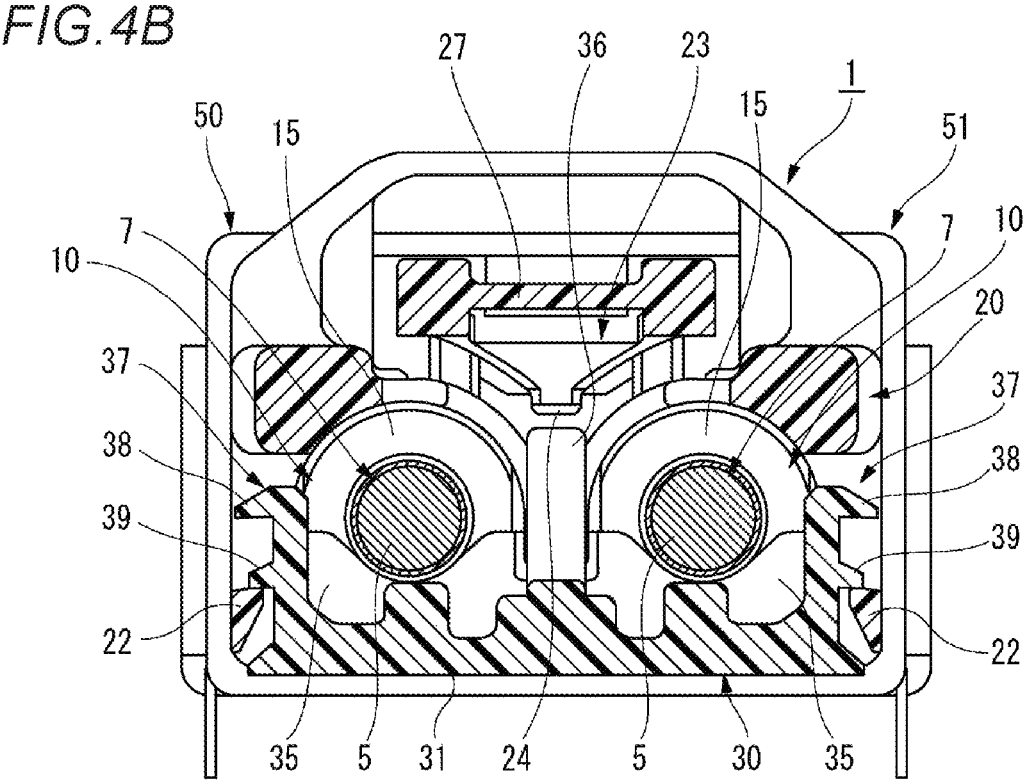
FIG. 4B is a sectional view taken along a line IV-IV in FIG. 4A.
Figure 5:
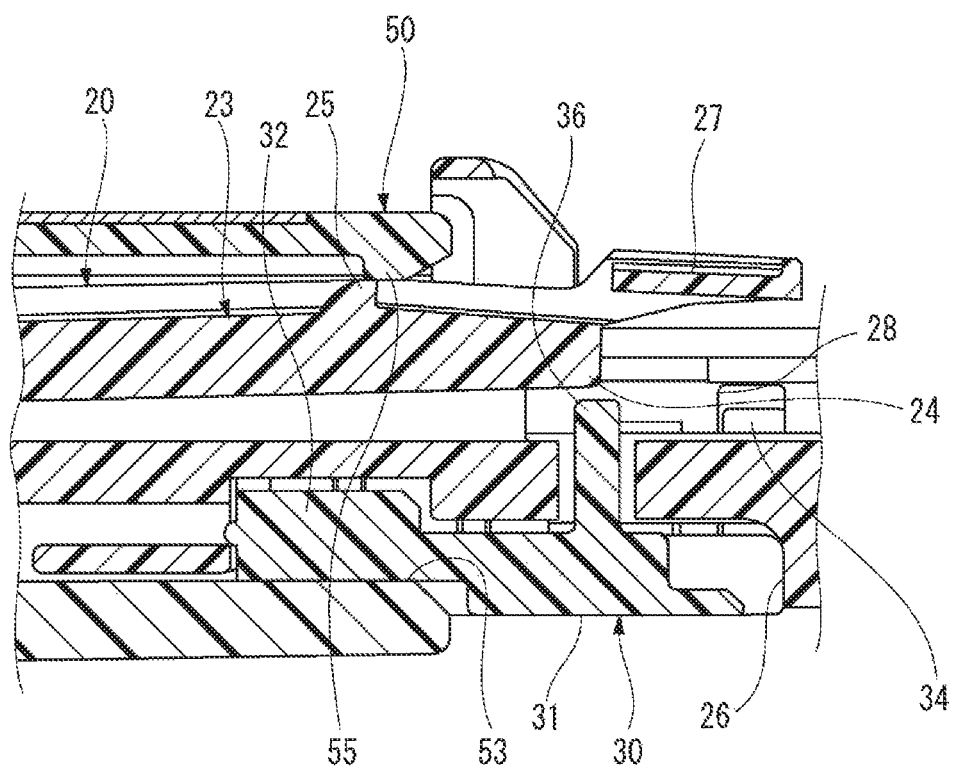
FIG. 5 is a sectional view of a main part so as to explain a middle state that the optical connector is attached to or detached from the mating optical connector.

FIG. 1 is a perspective view of an optical connector 1 and a mating optical connector 51 according to the present embodiment. FIG. 2 is an exploded perspective view of the optical connector 1 in FIG. 1. FIG. 3 is a perspective view when a ferrule 10 provided at an end portion of an optical fiber 3 is removed from the optical connector 1. FIG. 4A is a longitudinal sectional view of the optical connector 1 in FIG. 1 and FIG. 4B is a sectional view taken along a line IV-IV in FIG. 4A. FIG. 5 is a sectional view of a main part when the optical connector 1 is attached to or detached from the mating optical connector 51.

As shown in FIG. 1, the optical connector 1 according to the present embodiment is a plug connector to which the receptacle mating optical connector 51 is fitted. The mating optical connector 51 is mounted on a circuit board (not shown). The optical connector 1 is fitted into a fitting recess 53 provided on the mating optical connector 51. The mating optical connector 51 according to the present embodiment is not limited to the receptacle optical connector and may be an in-line fitting optical connector.

As shown in FIGS. 2 and 3, the optical connector 1 includes a plug housing 20 serving as a housing that accommodates the ferrule 10 coupled to the end portion of the optical fiber 3, and a holder 30 that holds the ferrule 10 to be accommodated in the plug housing 20.

The optical fiber 3 includes an optical fiber wire 5 covered by a plastic resin 7. The optical fiber 3 may be a single mode fiber, a multimode fiber, or the like. The material of the optical fiber wire 5 may be quartz, plastic, or the like.

In the present embodiment, two ferrules 10 are arranged in parallel. The optical fiber wire 5 of the optical fiber 3 is inserted into each of the ferrules 10 to form a ferrule assembly 2. In the ferrule assembly 2, an end surface of the optical fiber 3 is polished by a polishing jig (not shown) that holds the ferrule assembly 2 and a polishing machine (not shown) that polishes a front end surface of the ferrule 10. The ferrule 10 side of the ferrule assembly 2 is accommodated in a ferrule accommodation chamber of the plug housing 20.

The ferrule 10 includes a pair of annular flange portions 11, 13 at an axially middle portion on an outer periphery and an annular rear end portion 15 on an axially rear side of the outer periphery. The pair of annular flange portions 11, 13 and the annular rear end portion 15 have substantially the same outer diameter and protrude radially outward.

The plug housing 20 is formed of synthetic resin and has a coupling opening 21 on a front side that corresponds to a ferrule (not shown) of the mating optical connector 51. The ferrule accommodation chamber is provided on a deep side of the coupling opening 21, in which the pair of ferrules 10 are accommodated.

The plug housing 20 is provided with a flexible lock sheet 29 on two side walls. The flexible lock sheet 29 is swingable about a swing center shaft extending up and down. In a normal state, a lock portion of the flexible lock sheet 29 protrudes into the ferrule accommodation chamber of the plug housing 20.

Rearward of the flexible lock sheet 29 is provided with a locked portion 22 to which a lock portion 37 of the holder 30 to be described later is locked. The plug housing 20 has a slide groove 28 (see FIGS. 4A and 4B) on inner surfaces of two side walls rearward of the locked portion 22. The slide groove 28 extends up and down.

The plug housing 20 is provided with a lock arm 23 on an upper surface thereof. As shown in FIGS. 4A and 4B, the lock arm 23 is a cantilever shaped flexible arm extending from a front end side to a rear end side of the plug housing 20. The lock arm 23 includes a lock protrusion 25 hooked on a mating housing 50 of the mating optical connector 51, an operation portion 27, and a pressing portion 24 that is pressed against a holder protrusion 36 of the holder 30 to be described later.

The plug housing 20 has a holder attachment opening 26 on a lower surface thereof, which can receive the holder 30.

As shown in FIGS. 2 and 4, the holder 30 includes a holder plate portion 31 whose shape in a bottom view is substantially the same as that of the holder attachment opening 26 of the plug housing 20.

The holder plate portion 31 includes a ferrule holding protrusion 32 and a ferrule lock portion 35 on a surface of a side from which the holder plate portion 31 is attached to the plug housing 20. The ferrule holding protrusion 32 and the ferrule lock portion 35 protrude in a direction in which the holder plate portion 31 is attached to the plug housing 20.

The holder 30 is attached to the plug housing 20 with the ferrule lock portion 35 disposed in a direction orthogonal to a direction in which the optical connector 1 is coupled to the plug housing 20. By doing so, a rear end portion of the ferrule 10, on which the annular rear end portion 15 is provided, is locked by the ferrule lock portion 35 so that the ferrule 10 is positioned in the axial direction and is prevented from coming off.

The holder 30 is attached to the plug housing 20 with the ferrule holding protrusion 32 disposed in the front-rear direction of the plug housing 20. By doing so, the ferrule holding protrusion 32 enters into the space between the pair of ferrules 10 inserted into the ferrule accommodation chamber of the plug housing 20. Accordingly, the ferrule 10 is held by the plug housing 20 and the ferrule holding protrusion 32 of the holder 30.

The holder plate portion 31 further includes the lock portion 37 on two side portions thereof. The lock portion 37 extends in a direction of being attached to the plug housing 20 and is locked to the locked portion 22 provided on the plug housing 20.

The lock portion 37 is a flexible arm including a temporary lock claw 38 serving as a temporary lock portion that holds the holder 30 to the plug housing 20 in a temporary lock position to allow the ferrule 10 to be accommodated in the plug housing 20, and a main lock claw 39 serving as a main lock portion that holds the holder 30 in a main lock position by inserting the holder 30 into the plug housing 20 in a state in which the ferrule 10 is accommodated in the plug housing 20.

The locked portion 22 of the plug housing 20 has an upper surface serving as a lock surface to which lock surfaces of the temporary lock claw 38 and the main lock claw 39 are locked, and a lower surface serving as an inclined surface with which inclined surfaces of the temporary lock claw 38 and the main lock claw 39 are brought into sliding contact.

The temporary lock claw 38 protrudes on a top end side of the lock portion 37 and has an inclined surface on an upper surface and a lock surface on a lower surface. The inclined surface causes the lock portion 37 to flexibly deform by coming into sliding contact with the locked portion 22 and the lock surface is locked to the locked portion 22 with the lock portion 37 restored. With the holder 30 inserted into the plug housing 20 and the lock surface locked to the locked portion 22, the temporary lock claw 38 holds the holder 30 to the plug housing 20 in the temporary lock position (position shown in FIG. 3).

The ferrule lock portion 35 of the holder 30 is located below the temporary lock position of the holder 30 to allow the ferrule 10 side of the ferrule assembly 2 to be inserted into the plug housing 20 (see FIG. 7B).

The main lock claw 39 protrudes below the temporary lock claw 38 of the lock portion 37 and has an inclined surface on an upper surface and a lock surface on a lower surface. The inclined surface causes the lock portion 37 to flexibly deform by coming into sliding contact with the locked portion 22 and the lock surface is locked to the locked portion 22 with the lock portion 37 restored. With the holder 30 inserted into the plug housing 20 from the temporary lock position and the lock surface locked to the locked portion 22, the main lock claw 39 holds the holder 30 to the plug housing 20 in the main lock position (position shown in FIG. 3).

Figure 6A:
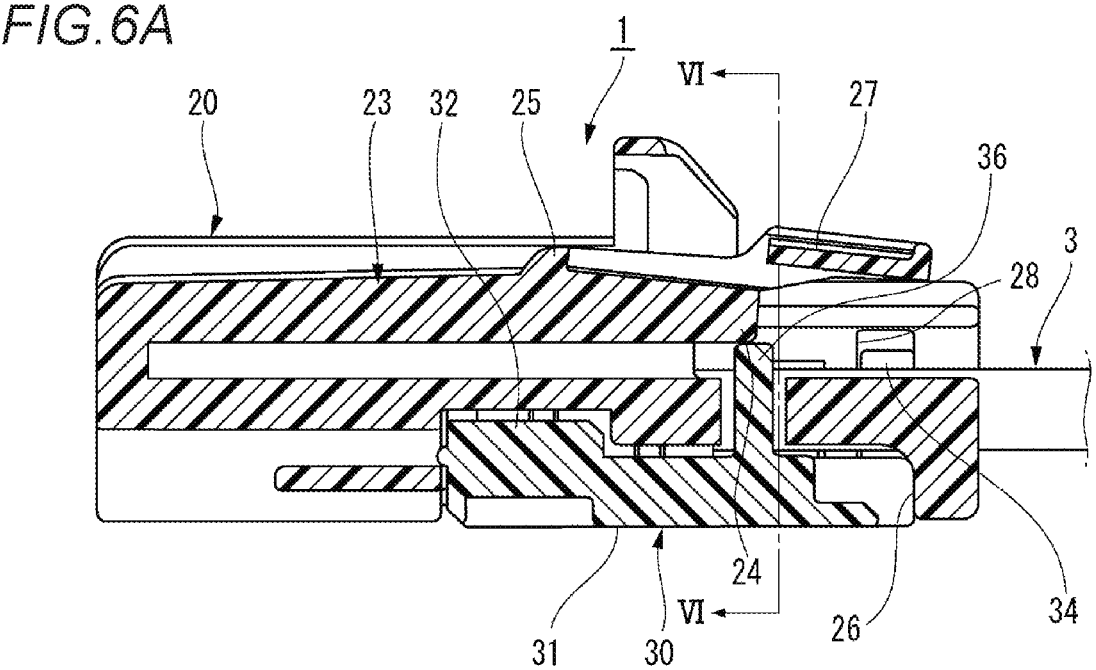
FIG. 6A is a longitudinal sectional view of the optical connector when a pressing portion abuts against a holder protrusion of a holder by unlocking a lock arm.
Figure 6B:
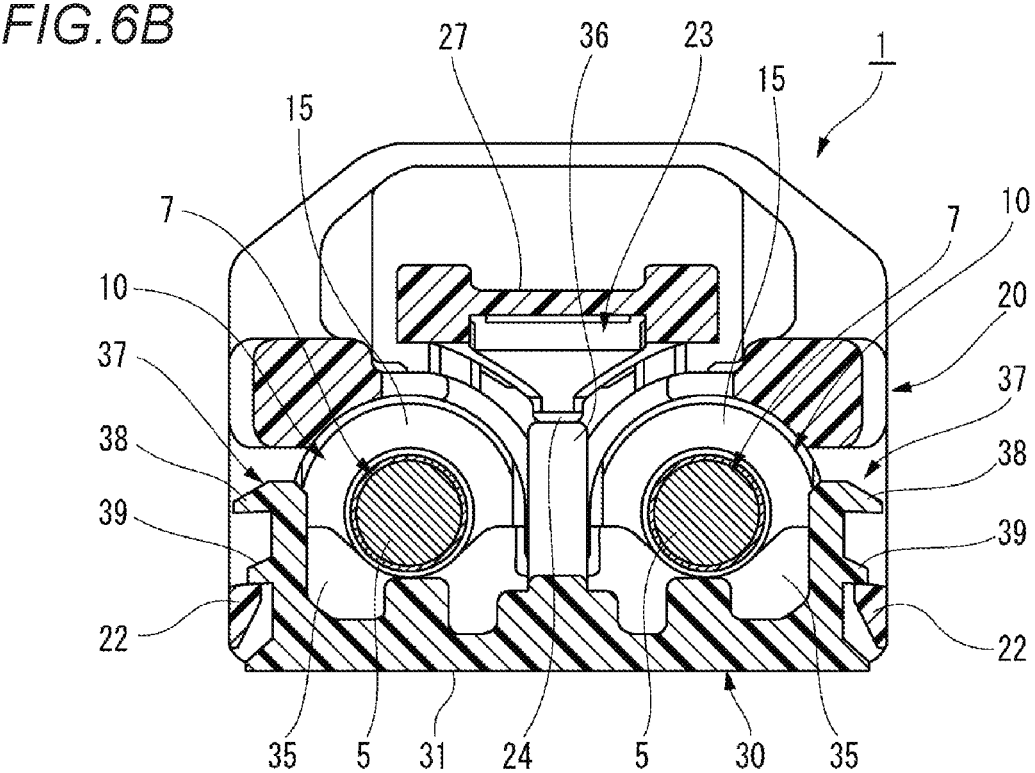
FIG. 6B is a sectional view taken along a line VI-VI in FIG. 6A.

The ferrule lock portion 35 of the holder 30 is located above the main lock position of the holder 30 so that the ferrule 10 of the ferrule assembly 2 is locked and the ferrule assembly 2 is prevented from coming off from the plug housing 20 (see FIG. 6B).

The holder plate portion 31 of the holder 30 includes a slide rail 34 in a position in the vicinity of the lock portion 37. The slide rail 34 extends in the direction of being attached to the plug housing 20.

The holder plate portion 31 includes the holder protrusion 36 on the surface of the side where the holder plate portion 31 is attached to the plug housing 20. When the holder 30 is attached to the plug housing 20, the holder protrusion 36 protrudes in the attachment direction while facing the pressing portion 24 of the lock arm 23.

The holder protrusion 36 is provided in a middle position between a pair of lock portions 37 provided on two sides in the width direction of the holder plate portion 31.

As shown in FIGS. 4A and 4B, when the holder 30 is attached to the holder attachment opening 26 of the plug housing 20 and held in the main lock position, the holder protrusion 36 has a height leaving a predetermined gap G between the pressing portion 24 of the lock arm 23 and a top end portion (upper end portion) of the holder protrusion 36.

When the optical connector 1 is attached to or detached from the mating optical connector 51, the lock protrusion 25 of the lock arm 23 is disengaged from a lock portion 55 of the mating housing 50 and accordingly, a swing end of the lock arm 23 is displaced downward. Therefore, as shown in FIG. 5, the predetermined gap G has such a size that the pressing portion 24 of the downward displaced lock arm 23 would not abut against the top end portion of the holder protrusion 36.

Next, a case in which the optical connector 1 according to the present embodiment is assembled will be described.

First, the ferrule 10 of the ferrule assembly 2 is inserted into the ferrule accommodation chamber of the plug housing 20 from rearward. At this time, the holder 30 is fitted into the holder attachment opening 26 of the plug housing 20 and the temporary lock claw 38 of the lock portion 37 is locked to the locked portion 22 (see FIG. 3).

The ferrule 10 is inserted to a predetermined position in which the front end portion of the ferrule 10 is inserted into the coupling opening 21. Then, the lock portion of the flexible lock sheet 29 provided on two side walls of the plug housing 20 is engaged between the pair of annular flange portions 11, 13 and the ferrule 10 is locked to the plug housing 20.

Thereafter, the holder 30 in the temporary lock state is pressed toward the plug housing 20. Accordingly, the holder 30 is brought into the main lock state in which the main lock claw 39 of the lock portion 37 is locked to the locked portion 22 (see FIG. 1). When the holder 30 is pressed toward the plug housing 20, the ferrule 10 is locked by the flexible lock sheet 29. For this reason, the ferrule assembly 2 can be prevented from inadvertently coming out of the plug housing 20.

In this way, when the holder 30 is pressed to the plug housing 20 and is brought into the main lock state, the ferrule lock portion 35 of the holder 30 is located above and the ferrule 10 of the ferrule assembly 2 is locked. Therefore, the ferrule assembly 2 is prevented from coming off from the plug housing 20.

In this way, a pair of slide rails 34 are provided on the holder 30 that is moved to the plug housing 20 through the temporary lock position and the main lock position, and a pair of slide grooves 28 with which the pair of slide rails 34 are respectively engaged are provided on the plug housing 20.

Therefore, with the pair of slide rails 34 engaged with the pair of slide grooves 28, the holder 30 can be inserted into the plug housing 20 and be prevented from being rotated or tilted relative to the plug housing 20 when the temporary lock claw 38 of the lock portion 37 is locked to the locked portion 22. With the slide rails 34 engaged with the slide grooves 28, it is also possible to prevent inclination of the holder 30 relative to the plug housing 20 in the temporary lock position. With the slide rails 34 engaged with the slide grooves 28, even when the holder 30 moves from the temporary lock position to the main lock position relative to the plug housing 20, the holder 30 would not be inclined relative to the plug housing 20 and can be guided into the plug housing 20 by being stably inserted.

The optical connector 1 assembled in this way is fitted to the mating optical connector 51, as is shown in FIG. 4A. The lock protrusion 25 of the lock arm 23 is engaged with the lock portion 55 of the mating housing 50 so that the optical connector 1 is fitting-locked. At this time, the swing end portion of the lock arm 23 is displaced downward and the pressing portion 24 of the downward displaced lock arm 23 would not abut against the top end portion of the holder protrusion 36.

When the optical connector 1 is released from being fitted with the mating optical connector 51, the optical connector 1 can be detached from the mating optical connector 51 by pressing the operation portion 27 of the lock arm 23 and releasing the lock protrusion 25 from being engaged with the lock portion 55 of the mating housing 50.

Next, a case in which the holder 30 of the optical connector 1 according to the present embodiment is released from the main lock state into the temporary lock state relative to the plug housing 20 will be described.

Figure 7A:
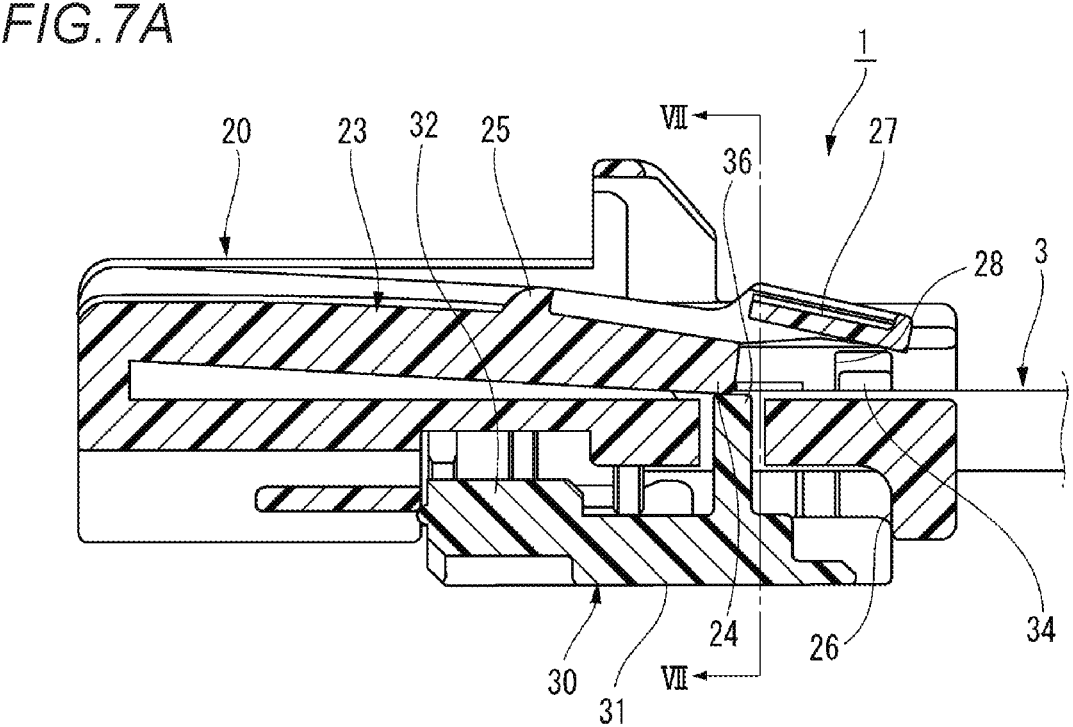
FIG. 7A is a longitudinal sectional view of the optical connector when the holder is moved to a temporary lock position by pressing the holder protrusion of the holder with the pressing portion of the lock arm.

FIG. 6A is a longitudinal sectional view of the optical connector 1 when the pressing portion 24 is abutted against the holder protrusion 36 of the holder 30 by unlocking the lock arm and FIG. 6B is a sectional view taken along a line VI-VI in FIG. 6A. FIG. 7A is a longitudinal sectional view of the optical connector 1 when the holder 30 is moved to the temporary lock position by pressing the holder protrusion 36 of the holder 30 with the pressing portion 24 of the lock arm 23 and FIG. 7B is a sectional view taken along a line VII-VII in FIG. 7A.

First, as shown in FIGS. 6A and 6B, the operation portion 27 of the lock arm 23 is pressed so that the lock arm 23 is flexibly deformed by a predetermined amount or more in a direction (downward in the drawing) of unlocking the lock arm 23. When the lock arm 23 is flexibly deformed by a predetermined amount or more in the unlocking direction, the pressing portion 24 of the lock arm 23 is abutted against the holder protrusion 36 provided on the holder 30 holding the ferrule 10 in the plug housing 20.

Figure 7B:
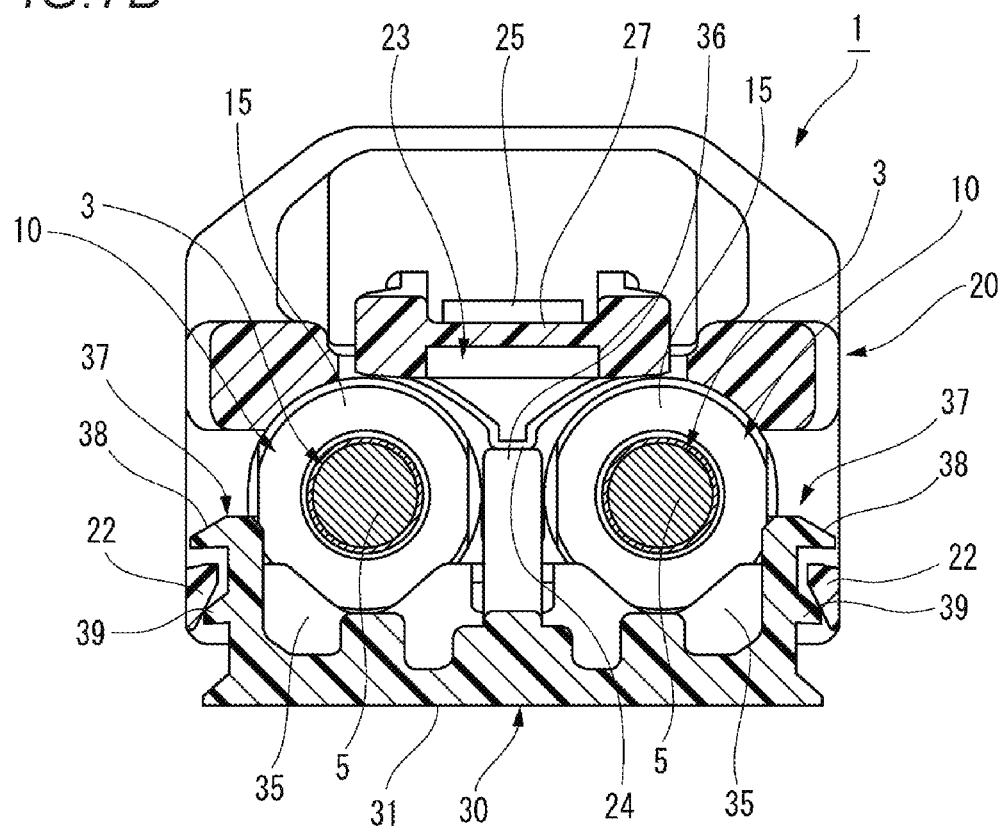
FIG. 7B is a sectional view taken along a line VII-VII in FIG. 7A.

As shown in FIGS. 7A and 7B, by further flexibly deforming the lock arm 23 in the unlocking direction, the holder 30 in the main lock state pressed by the holder protrusion 36 is displaced in a direction (downward in the drawing) of releasing the ferrule 10 from being held. Then, the holder 30 in which the main lock claw 39 of the lock portion 37 is detached from the locked portion 22 is brought into the temporary lock state in which the temporary lock claw 38 of the lock portion 37 is locked to the locked portion 22. At this time, the ferrule lock portion 35 of the holder 30 is located below so that the ferrule 10 of the ferrule assembly 2 is unlocked. Therefore, the ferrule assembly 2 can be removed from the plug housing 20.

That is, by pressing the operation portion 27 of the lock arm 23 and causing the lock arm 23 to flexibly deform by a predetermined amount or more, the holder 30 can be displaced in a direction of releasing the ferrule 10 from being held so that the ferrule 10 can be released from being held in the plug housing 20. Therefore, no holder releasing jig is necessary. When the plug housing 20 is released from being fitted with the mating housing 50, the lock arm 23 is flexibly deformed and released from being locked to the mating housing 50. In conjunction with this, the holder 30 can be released from holding the ferrule 10. It is also possible to easily release the holder 30 from the plug housing 20 and improve the maintainability.

Further, according to the optical connector 1 in the present embodiment, the holder 30 is locked to the locked portion 22 of the plug housing 20 via the lock portion 37 including the temporary lock claw 38 and the main lock claw 39.

Therefore, when the holder 30 in the main lock position, in which the main lock claw 39 is locked to the locked portion 22 of the plug housing 20 to hold the ferrule 10 in the plug housing 20, is displaced in the direction of releasing the ferrule 10 from being held via the lock arm 23 flexibly deformed in the unlocking direction, the temporary lock claw 38 moves to the temporary lock position of being locked to the locked portion 22 of the plug housing 20. Accordingly, the holder 30 displaced in the direction of releasing the ferrule 10 from being held would not be inadvertently detached from the plug housing 20.

According to the optical connector 1 in the present embodiment, when the holder 30 in the main lock position moves to the temporary lock position via the lock arm 23 flexibly deformed in the unlocking direction, the lock arm 23 is abutted against the holder protrusion 36 provided in the middle position between the pair of lock portions 37 extending on two side portions of the holder plate portion 31 of the holder 30. By flexibly deforming the lock arm 23 in the unlocking direction, the holder 30 is pressed via the holder protrusion 36 and displaced in the direction of releasing the ferrule 10 from being held.

Therefore, a pressing force acting on the holder protrusion 36 evenly acts on the pair of lock portions 37 extending on two side portions of the holder plate portion 31 in the holder 30 so that the lock portions 37 can be evenly flexibly deformed in the unlocking direction. Therefore, the holder 30 can smoothly move to the temporary lock position without tilting.

Next, a holder 30A according to a modification of the optical connector 1 in the present embodiment will be described.

Figure 8:
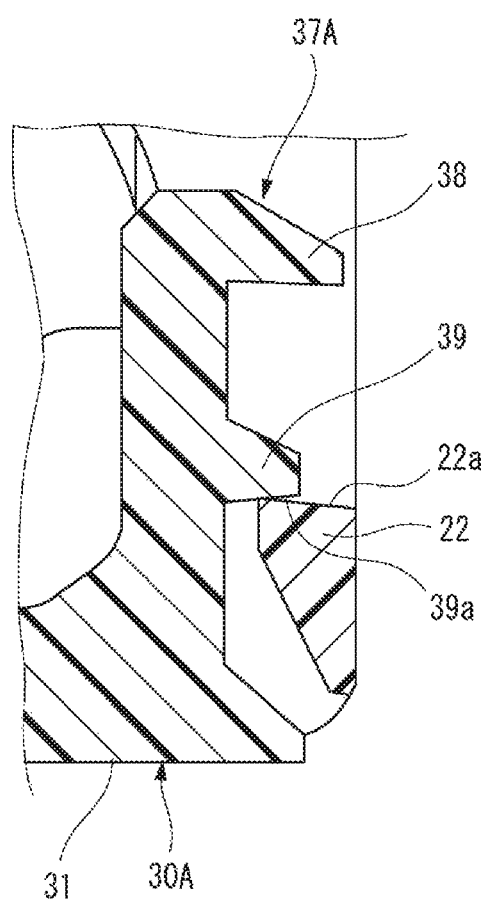
FIG. 8 is an enlarged sectional view of a main part of a holder according to a modification of the optical connector in the present embodiment.

FIG. 8 is an enlarged sectional view of a main part of the holder 30A according to the modification of the optical connector 1 in the present embodiment. The holder 30A according to the present modification has the same configuration as that of the holder 30 except that a lock portion 37A is used as the lock portion 37 of the holder 30.

In the holder 30A shown in FIG. 8, a lock surface 39a of the main lock claw 39 of the lock portion 37A is an inclined surface (lower surface of the main lock claw 39 inclined upward from a base portion side to a distal end side of the main lock claw 39) that causes the lock portion 37A to flexibly deform in an unlocking direction (leftward in the drawing) by coming into sliding contact with a lock surface 22a of the locked portion 22 of the plug housing 20.

According to the optical connector 1 including the holder 30A in the present modification, the lock surface 39a of the main lock claw 39 is an inclined surface that causes the lock portion 37A to flexibly deform in the unlocking direction by coming into sliding contact with the lock surface 22a of the locked portion 22 of the plug housing 20.

Therefore, when the holder 30A in the main lock position is displaced in the direction of releasing the ferrule 10 from being held, the main lock claw 39 is smoothly released from the locked portion 22. Since the holder 30A is displaced in the direction of releasing the ferrule 10 from being held, the operating force causing the lock arm 23 to flexibly deform by pressing the operation portion 27 of the lock arm 23 can be reduced.

Therefore, according to the optical connector 1 in the present embodiment, it is possible to easily release the holder 30 from the plug housing 20 without a holder releasing jig and improve maintainability.

The present invention is not limited to the embodiment described above and may be appropriately modified, improved or the like. Materials, shapes, sizes, numbers, arrangement positions, and the like of components in the above-described embodiment are arbitrary and are not limited as long as the present invention can be achieved.

Also, characteristics of the embodiment of the optical connector according to the present invention will be briefly summarized in the following [1] to [4].

[1] An optical connector (1) includes:
an optical fiber (3);
a ferrule (10) provided at an end portion of the optical fiber (3);
a housing (plug housing 20) in which the ferrule (10) is accommodated:
a lock arm (23) that is provided on the housing (plug housing 20) and is flexibly deformed when being fitted with a mating housing (50) and restores after the fitting to lock the mating housing (50) so that the housing (plug housing 20) and the mating housing (50) are held in a fitted state;
a holder (30) assembled to the housing (plug housing 20) to hold the ferrule (10) in the housing (plug housing 20); and
a holder protrusion (36) that is provided on the holder (30) and is pressed by the lock arm (23) which is flexibly deformed in an unlocking direction by a predetermined amount or more so that the holder (30) is displaced in a direction of releasing the ferrule (10) from being held by the holder (30).

[2] The optical connector (1) according to [1], wherein the holder (30) is locked to a locked portion (22) of the housing (plug housing 20) by a lock portion (37), the lock portion (37) including a temporary lock portion (temporary lock claw 38) that holds the holder (30) to the housing (plug housing 20) to allow the ferrule (10) to be inserted into the housing (plug housing 20), and a main lock portion (main lock claw 39) that holds the holder (30) by inserting the holder (30) into the housing (plug housing 20) in a state in which the ferrule (10) is accommodated in the housing (plug housing 20).

[3] The optical connector (1) according to [2], wherein a lock surface (39a) of the main lock portion (main lock claw 39) is an inclined surface that causes the lock portion (37A) to flexibly deform in an unlocking direction by coming into sliding contact with a lock surface (22a) of the locked portion (22).

[4] The optical connector (1) according to [2], wherein the holder protrusion (36) is provided in a middle position between a pair of lock portions (37) extending on two side portions of the holder (30) in a direction of being attached to the housing (plug housing 20).

What is claimed is:
1. An optical connector comprising:
an optical fiber;
a ferrule provided at an end portion of the optical fiber;
a housing in which the ferrule is accommodated;
a lock arm that is provided on the housing and is flexibly deformed when being fitted with a mating housing and restores after the fitting to lock the mating housing so that the housing and the mating housing are held in a fitted state;
a holder assembled to the housing to hold the ferrule in the housing; and
a holder protrusion that is provided on the holder and is pressed by the lock arm which is flexibly deformed in an unlocking direction by a predetermined amount or more so that the holder is displaced in a direction of releasing the ferrule from being held by the holder, and
wherein the holder is locked to a locked portion of the housing by a lock portion, the lock portion including a temporary lock portion that holds the holder to the housing to allow the ferrule to be inserted into the housing, and a main lock portion that holds the holder by inserting the holder into the housing in a state in which the ferrule is accommodated in the housing.

2. The optical connector according to claim 1, wherein a lock surface of the main lock portion is an inclined surface that causes the lock portion to flexibly deform in the unlocking direction by coming into sliding contact with a lock surface of the locked portion.

3. The optical connector according to claim 1, wherein the holder protrusion is provided in a middle position between a pair of the lock portions extending on both sides of the holder in an attaching direction in which the holder is attached to the housing.

* * * * *